(12) United States Patent
Ochawar et al.

(10) Patent No.: US 11,519,365 B2
(45) Date of Patent: Dec. 6, 2022

(54) INTAKE SYSTEM FOR NATURAL GAS ENGINE

(71) Applicant: CUMMINS INC., Columbus, IN (US)

(72) Inventors: Santosh Kishor Ochawar, Wani (IN); Ashwini Rahul Mule, Pune (IN); Rene Carrillo, Wuhan (CN); Fei Li, Wuhan (CN); Xinwei Meng, Wuhan (CN); Yuejin Xi, Beijing (CN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/697,596

(22) Filed: Mar. 17, 2022

(65) Prior Publication Data
US 2022/0333556 A1 Oct. 20, 2022

(30) Foreign Application Priority Data
Apr. 15, 2021 (CN) .......................... 202110404979.9

(51) Int. Cl.
*F02M 21/04* (2006.01)
*F02M 35/10* (2006.01)
*F02M 21/02* (2006.01)
*F02M 26/17* (2016.01)

(52) U.S. Cl.
CPC ........ *F02M 21/04* (2013.01); *F02M 21/0209* (2013.01); *F02M 26/17* (2016.02); *F02M 35/10216* (2013.01); *F02M 35/10222* (2013.01); *F02M 35/10262* (2013.01)

(58) Field of Classification Search
CPC .... F02M 21/04; F02M 21/0209; F02M 26/17; F02M 35/10216; F02M 35/10222; F02M 35/10262
See application file for complete search history.

(56) References Cited

U.S. PATENT DOCUMENTS

| 6,425,382 | B1 * | 7/2002 | Marthaler | ............. | F02M 26/19 |
| | | | | | 123/568.17 |
| 2017/0044956 | A1 * | 2/2017 | Zhang | ..................... | B01F 23/10 |
| 2017/0138319 | A1 * | 5/2017 | Zurlo | ..................... | F02M 26/06 |

FOREIGN PATENT DOCUMENTS

| CN | 104265513 | 1/2015 |
| CN | 108425768 | 8/2018 |
| CN | 109322766 | 2/2019 |
| CN | 109441670 | 3/2019 |
| CN | 111173649 | 5/2020 |
| WO | WO-2014/035587 | 3/2014 |

* cited by examiner

*Primary Examiner* — Xiao En Mo
(74) *Attorney, Agent, or Firm* — Foley & Lardner LLP

(57) ABSTRACT

The present invention relates to an intake system for natural gas engine. An intake system for an engine is provided. A conduit is configured to direct a combustible mixture to a cylinder head. A mixing unit is coupled to the conduit. The mixing unit includes a fuel doser configured to dispense fuel into the conduit and a first mixer positioned downstream of the fuel doser. The first mixer is configured to mix air and the fuel. The mixing unit further includes a exhaust gas doser configured to dispense exhaust gas into the conduit and a second mixer positioned downstream of the exhaust gas doser. The second mixer is configured to mix the exhaust gas with the air and the fuel to make the combustible mixture. An air intake throttle is configured to direct the air into the mixing unit.

25 Claims, 5 Drawing Sheets

INTAKE SYSTEM FOR NATURAL GAS ENGINE

CROSS-REFERENCE TO RELATED APPLICATIONS

This application claims the benefit of and priority to Chinese Patent Application No. 202110404979.9, filed Apr. 15, 2021, the content of which is herein incorporated by reference in its entirety.

TECHNICAL FIELD

The present invention relates generally to an intake system for a natural gas engine.

BACKGROUND

Natural gas has become a more common fuel source in recent years. When compared to other fuel sources used in internal combustion engines, natural gas engines tend to produce less nitrogen oxide ($NO_x$) and greenhouse emissions. Natural gas engines also tend to be more cost-effective due to the abundance of natural gas.

Natural gas powered vehicles operate much like gasoline powered vehicles with spark-ignited internal combustion engines. The engine of a natural gas powered vehicle functions the same way as a gasoline engine. Natural gas is stored in a fuel tank, or cylinder. The fuel system transfers high-pressure gas from the fuel tank through the fuel lines, where a pressure regulator reduces the pressure to a level compatible with the engine fuel injection system. Finally, the fuel is introduced into the intake manifold or combustion chamber, where it is mixed with air and then compressed and ignited by a spark plug.

SUMMARY

In one set of embodiments, an intake system for an engine includes a conduit configured to direct a combustible mixture to a cylinder head. A mixing unit is coupled to the conduit. The mixing unit comprises a fuel doser configured to dispense fuel into the conduit and a first mixer positioned downstream of the fuel doser. The first mixer is configured to mix air and the fuel. The mixing unit further comprises a exhaust gas doser configured to dispense exhaust gas into the conduit and a second mixer positioned downstream of the exhaust gas doser. The second mixer is configured to mix the exhaust gas with the air and the fuel to make the combustible mixture. An air intake throttle is configured to direct the air into the mixing unit.

In some embodiments, the intake system further comprises: a fuel pathway in fluid communication with the fuel doser, the fuel pathway configured to direct the fuel from a fuel system to the fuel doser; and an exhaust gas pathway in fluid communication with the exhaust gas doser, the exhaust gas pathway configured to direct the exhaust gas from an exhaust gas recirculation system to the exhaust gas doser. In some embodiments, the fuel doser comprises a first atomizer configured to dispense the fuel into the conduit, and wherein the exhaust gas doser comprises a second atomizer configured to dispense the exhaust gas into the conduit. In some embodiments, the fuel doser is positioned upstream of the exhaust gas doser. In some embodiments, the fuel doser is positioned downstream of the exhaust gas doser. In some embodiments, the fuel comprises natural gas.

In another set of embodiments, a mixing unit is positioned within an intake system of an engine system and is in fluid communication with a fuel system of the engine system and an exhaust gas recirculation system of the engine system. The mixing unit includes a conduit and a fuel doser positioned within the conduit. The fuel doser includes a first upstream portion, a first downstream portion, and a first recessed portion positioned between the first upstream portion, the first downstream portion, and the conduit. The first recessed portion is configured to receive fuel from the fuel system and direct the fuel into the conduit to mix the fuel with air flowing through the conduit. The mixing unit includes a exhaust gas doser positioned within the conduit and downstream of the fuel doser. The exhaust gas doser includes a second upstream portion, a second downstream portion, and a second recessed portion positioned between the second upstream portion, the second downstream portion, and the conduit. The second recessed portion is configured to receive exhaust gas from the exhaust gas recirculation system and direct the exhaust gas into the conduit to mix the exhaust gas with the fuel and the air flowing through the conduit.

In some embodiments, the fuel doser further comprises: a first plurality of openings defined by the first upstream portion and extending entirely through the first upstream portion such that the first recessed portion is in fluid communication with an upstream portion of the conduit; and a second plurality of openings defined by the first downstream portion and extending entirely through the first downstream portion such that the first recessed portion is in fluid communication with a downstream portion of the conduit.

In some embodiments, the fuel doser further comprises: a central hub; and a plurality of spokes coupled with and extending between an inner surface of the fuel doser and the central hub. In some embodiments, the fuel doser defines a plurality of internal channels defined by the plurality of spokes, each of the plurality of internal channels associated with a corresponding one of the plurality of spokes, the plurality of internal channels in fluid communication with the first recessed portion. In some embodiments, each of the plurality of spokes defines a third plurality of openings extending entirely through each of the plurality of spokes in a downstream direction such that each of the plurality of internal channels is in fluid communication with each of the third plurality of openings.

In some embodiments, the central hub defines a hollow portion in fluid communication with the plurality of internal channels and defines a plurality of apertures extending entirely through the central hub in a downstream direction such that the hollow portion is in fluid communication with the conduit. In some embodiments, the mixing unit further comprises a first mixer positioned downstream of the fuel doser, the first mixer comprising: an outer portion; a central hub; and a plurality of fins coupled to and extending between the outer portion and the central hub of the first mixer, the plurality of fins configured to alter a flow direction of the fuel and the air flowing through the conduit to cause the fuel and the air to mix.

In yet another set of embodiments, an engine system is provided. An intake system is positioned between an air source and a cylinder head, the intake system comprises a conduit configured to direct a combustible mixture to the cylinder head and a mixing unit coupled to the conduit. The mixing unit comprises a fuel doser configured to dispense a first material into the conduit, a exhaust gas doser configured to dispense a second material into the conduit, a first mixer positioned between the fuel doser and the exhaust gas doser, and a second mixer positioned downstream of the fuel doser and the exhaust gas doser. The second mixer comprises a second outer portion and a second central hub. An air intake throttle is in communication with the air source, the air intake throttle configured to direct the air into the mixing unit.

In some embodiments, the engine system further comprises: a first pathway in fluid communication with the fuel doser, the first pathway configured to direct the first material to the fuel doser; and a second pathway in fluid communication with the exhaust gas doser, the second pathway configured to direct the second material to the exhaust gas doser. In some embodiments, the fuel doser comprises a first atomizer configured to dispense the first material into the conduit, and wherein the exhaust gas doser comprises a second atomizer configured to dispense the second material into the conduit.

In some embodiments, the first mixer further comprises a first outer portion and a first central hub. In some embodiments, the first mixer further comprises a first plurality of fins coupled to and extending between the first outer portion and the first central hub. In some embodiments, the second mixer further comprises a second plurality of fins coupled to and extending between the second outer portion and the second central hub. In some embodiments, the first plurality of fins is configured to alter a flow direction of air flowing through the conduit and a flow direction of the first material or the second material to cause the air and the first material or the second material to mix. In some embodiments, the second plurality of fins is configured to alter a flow direction of the second material, the first material, and the air flowing through the conduit to cause the second material, the first material, and the air to mix to make a combustible material.

In some embodiments, the fuel doser is positioned upstream of the exhaust gas doser. In some embodiments, the first material is a fuel and the second material is exhaust gas. In some embodiments, the first material is exhaust gas and the second material is a fuel. In some embodiments, the fuel is natural gas.

DESCRIPTION OF THE DRAWINGS

The Details of One or More Implementations are Set Forth in the Accompanying Drawings and the Description Below. Other Features, Aspects, and Advantages of the Disclosure Will Become Apparent from the Description, the Drawings, and the Claims, in which:

DETAILED DESCRIPTION OF VARIOUS EMBODIMENTS

Following below are more detailed descriptions of various concepts related to, and implementations of, methods, apparatuses, and systems for an intake system for a natural gas engine. The various concepts introduced above and discussed in greater detail below may be implemented in any of numerous ways, as the described concepts are not limited to any particular manner of implementation. Examples of specific implementations and applications are provided primarily for illustrative purposes.

Implementations herein relate to an intake system of a natural gas engine. The intake system includes a mixing unit positioned near the inlet of the intake system. Embodiments of the mixing unit include at least a fuel doser to inject fuel (e.g., natural gas) into the intake system, and at least a exhaust gas doser for injecting exhaust gas into the intake system for exhaust gas recirculation (EGR). The mixing unit may also include one or more mixers to mix the air, fuel, and exhaust gas within the intake system. The air, fuel, and exhaust gas combine to form a combustible mixture that is directed through a conduit of the intake system and into a cylinder head.

Various embodiments of the system described herein provide benefits that can be applied to engine systems. The position of the mixing unit within the intake system provides for sufficient mixing of air, fuel, and exhaust gas within the intake system to generate a substantially homogeneous combustible mixture prior to injecting the combustible mixture into a cylinder for combustion. Furthermore, the combustible mixture delivered to the cylinder has a maximum variation in lambda of 0.969-1.012, where lambda is defined as the ratio of the air/fuel ratio in a cylinder to the stoichiometric air/fuel ratio. Furthermore, the difference between the highest EGR flowrate and the lowest EGR flowrate is within two percent.

Figure 1:
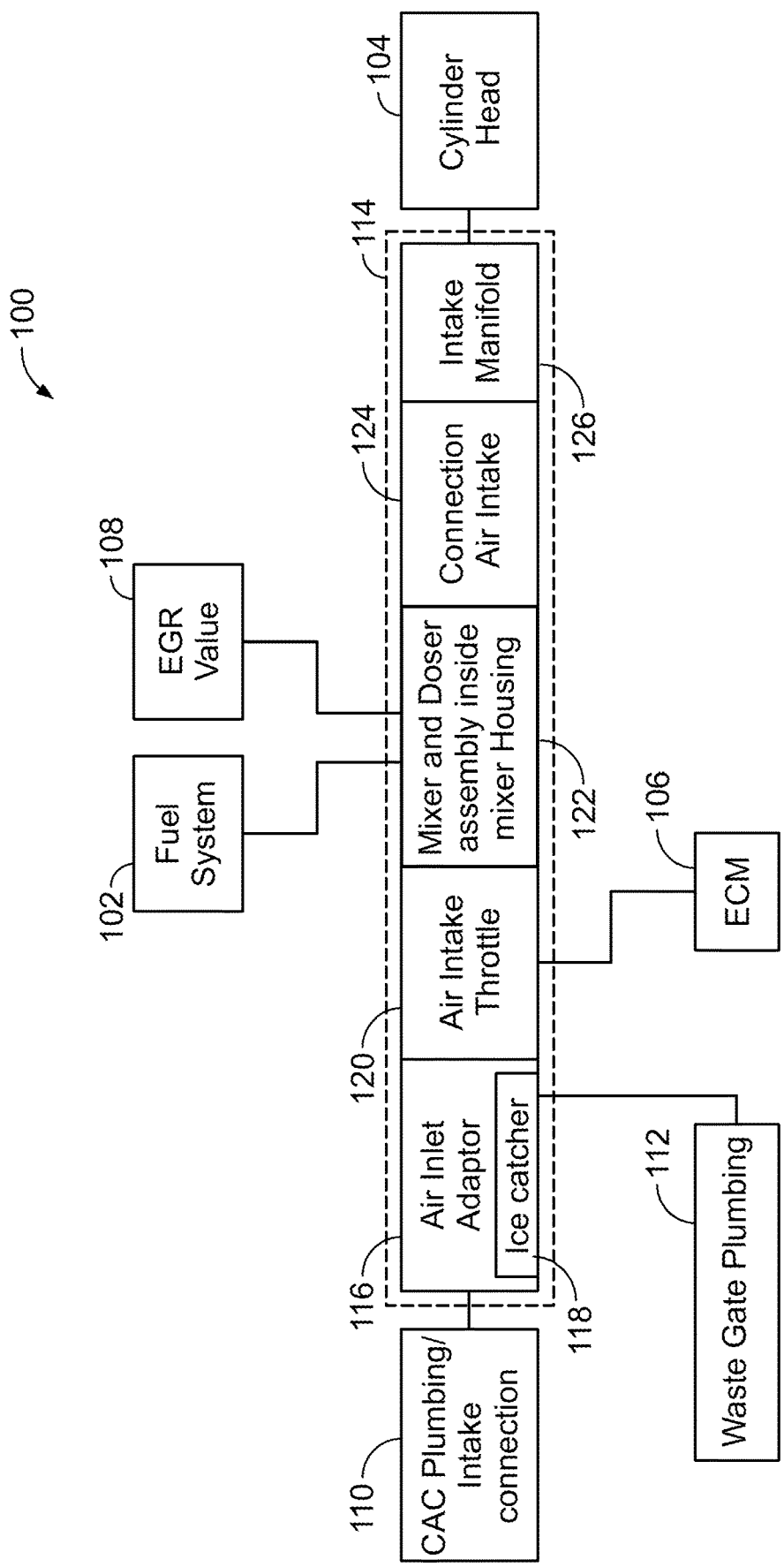
FIG. 1 is a block diagram of a portion of an example natural gas engine, according to a particular embodiment.

FIG. 1 is a block diagram of a portion of a natural gas engine 100 which for example, may be incorporated within a vehicle. The natural gas engine 100 includes a fuel system 102, a cylinder head 104, an engine control module (ECM) 106, an exhaust gas recirculation (EGR) valve 108, an intake connection 110, a waste gate valve 112, and an intake system 114. The fuel system 102 is configured to deliver fuel (e.g., natural gas) to the intake system 114 via a fuel line. In some embodiments, the fuel system 102 may include a fuel tank, a pressure regulator, a fuel filter, a fuel injector, and the fuel line. The fuel tank may store the fuel in a compressed state such that the pressure regulator is configured to regulate the amount of fuel that exits the fuel tank. The fuel filter is configured to remove impurities from the fuel to prevent such impurities from reaching one or more combustion cylinders associated with the cylinder head 104 and potentially causing damage to the one or more combustion cylinders. The fuel injector is configured to inject fuel into the intake system 114 to direct the fuel toward the combustion cylinder. In some embodiments, the fuel system 102 includes a fuel pump to pump the fuel through the fuel line and into the intake system 114.

The cylinder head 104 is positioned above the one or more combustion cylinders within a cylinder block. The cylinder head 104 is configured to enclose the one or more combustion cylinders to form combustion chambers. In some embodiments, the cylinder head 104 includes various passages that direct air and/or fuel into the one or more combustion cylinders to allow a combustion reaction to occur.

The ECM 106 is configured to control various operations of the natural gas engine 100. In some embodiments, the ECM 106 is in communication with various sensors within the natural gas engine 100, and the ECM 106 controls operations of the natural gas engine 100 based on information received from the various sensors. For example, and as shown in FIG. 1, the ECM 106 communicates with the intake system 114 and is configured to adjust the amount of air that enters the intake system 114 based on the operation of the natural gas engine 100.

The EGR valve 108 is part of an exhaust gas recirculation system that is configured to recirculate a portion of the exhaust gas of the natural gas engine 100 into the intake system 114 such that the exhaust gas mixes with the incoming air. Exhaust gas recirculation can reduce the temperature within a combustion cylinder by diluting the amount of oxygen provided to the combustion cylinder. Furthermore, exhaust gas recirculation can reduce the amount of harmful emissions and increase engine efficiency. The EGR valve 108 is coupled with the intake system 114 and is configured to allow a portion of the exhaust gas to enter the intake system 114.

The intake connection 110 is coupled with the intake system 114 and is configured to cool compressed air (e.g., charge air) from a turbocharger before directing the air to the intake system 114. Cooling the air that enters the intake system 114 (and therefore the combustion cylinder) allows denser air to enter the combustion cylinder, thereby allowing more fuel to be combusted per engine cycle, thereby increasing the power output from the engine.

The waste gate valve 112 is coupled to the intake system 114 and is configured to direct exhaust gases away from a turbocharger of the natural gas engine 100. Directing exhaust gases away from the turbocharger can regulate the rotational speed of a compressor within the turbocharger, thereby regulating the maximum boost pressure provided by the turbocharger.

The intake system 114 is configured to deliver a combustible mixture to the one or more combustion cylinders associated with the cylinder head 104. In some embodiments, the combustible mixture comprises air. The combustible mixture may also comprise a mixture of air and fuel, and in some instances the combustible mixture may also comprise a mixture of air, fuel, and exhaust gas. As shown, the intake system includes an air inlet adapter 116, an ice catcher 118, an air intake throttle 120, a mixing unit 122, a connection air intake 124, and an intake manifold 126.

The air inlet adapter 116 is configured to couple the intake connection 110 to the intake system 114 such that air flows from the turbocharger to the intake system 114 without losing any air to the environment. The air inlet adapter 116 can therefore be any type of device or component configured to couple the intake connection 110 to the intake system 114. Accordingly, the connection between the air inlet adapter 116 and the intake connection 110 may include a seal (e.g., an o-ring, gasket, or any other suitable sealing mechanism) configured to prevent air from escaping to the environment as the air is directed from the intake connection 110 to the air inlet adapter 116.

The ice catcher 118 is configured to remove ice that may form due to condensation of air and/or fuel. The ice catcher 118 may be any device or system that can prevent ice from moving through the intake system 114. For example, the ice catcher 118 may include a mesh filter that prevents ice particles of a particular size from passing through.

The air intake throttle 120 is configured to control the amount of air flowing through the intake system 114 and into the one or more combustion cylinders. The air intake throttle 120 is in communication with the ECM 106 and operates in response to commands from the ECM 106. For example, a position of the air intake throttle 120 may be related to a position of the accelerator pedal in the vehicle. When the accelerator pedal is fully depressed, the air intake throttle may be fully open to allow a maximum amount of air into the intake system 114. When the accelerator is halfway depressed, the air intake throttle may be halfway open to allow half of the maximum amount of air into the intake system 114.

The mixing unit 122 is coupled with the fuel system 102 and the EGR valve 108 and is configured to combine fuel and exhaust gas with the air flowing through the intake system 114 to create the combustible mixture. The mixing unit 122 is further described with reference to FIGS. 2-3.

The connection air intake 124 is configured to couple the mixing unit 122 to the intake manifold 126 such that the combustible mixture flows from the mixing unit 122 to the intake manifold 126 without losing any of the combustible mixture to the environment. The connection air intake 124 can therefore be any type of device or component configured to couple the mixing unit 122 to the intake manifold 126. Accordingly, the connection between the mixing unit 122 and the intake manifold 126 may include a seal (e.g., an o-ring, gasket, or any other suitable sealing mechanism) configured to prevent the combustible mixture from escaping to the environment as the combustible mixture is directed from the mixing unit 122 to the intake manifold 126.

The intake manifold 126 is coupled to the cylinder head 104 and is configured to direct the combustible mixture to the cylinder head 104, which directs the combustible mixture to the cylinders in the cylinder head 104 for combustion.

Figure 2:
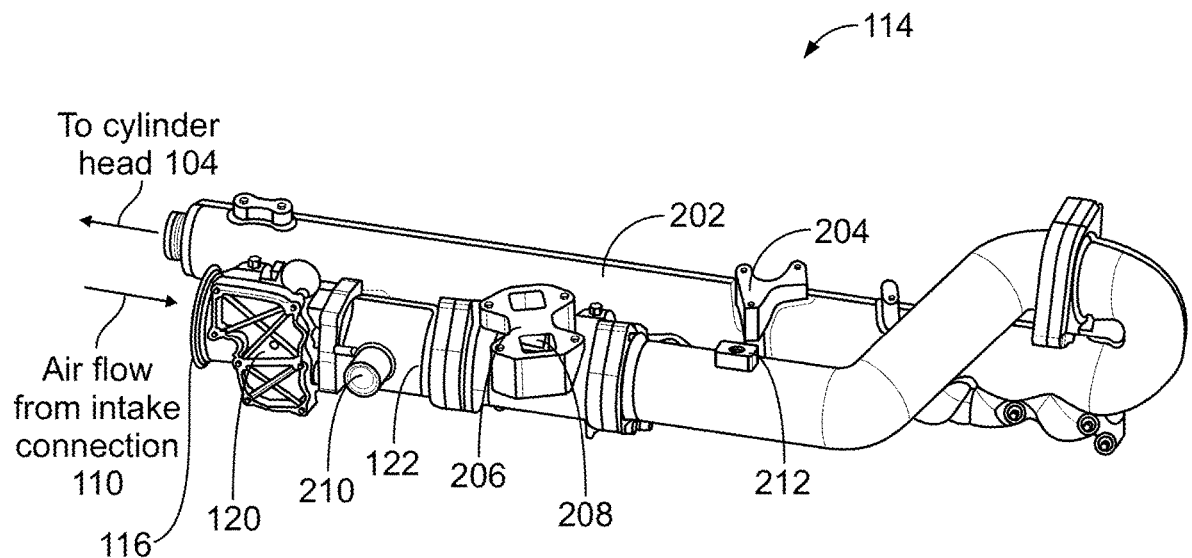
FIG. 2 is an illustration of an example intake system of the portion of the natural gas engine of FIG. 1, according to a particular embodiment.

FIG. 2 is an illustration of an example intake system 114 of the portion of the natural gas engine 100 of FIG. 1. As shown, the intake system 114 includes a conduit 202, an EGR sensor mount 204, an EGR valve mount 206, an EGR channel 208, a fuel channel 210, and an intake manifold pressure and temperature sensor 212 (hereinafter referred to as a "IMPT sensor 212"). The conduit 202 is coupled with the mixing unit 122 and is configured to direct the combustible mixture from the mixing unit 122 to the cylinder head 104. In some embodiments, the conduit 202 is in fluid communication with a manifold that includes a port for each cylinder in the cylinder head 104. In such embodiments, the combustible mixture is directed through the conduit 202 and into each port, and each port directs the combustible mixture to a cylinder in the cylinder head 104. The conduit 202 may comprise any material suitable to direct the combustible mixture as described. The conduit 202 may comprise materials including, but not limited to, metals (e.g., aluminum, steel, etc.) and plastics (e.g., polyethylene, etc.). As shown, the conduit 202 comprises a tortuous path. For example, the conduit 202 includes various bends and redirections configured to cause the components of the combustible mixture (e.g., air, fuel, and exhaust gas) to mix more thoroughly than if the conduit 202 extended in a straight line. A thorough mix (e.g., a substantially homogeneous mix) of the components of the combustible mixture can result in a more efficient combustion cycle.

The EGR sensor mount 204 is coupled to the conduit 202 and provides a structure to support an EGR pressure sensor (e.g., a Venturi sensor or Venturi meter, not shown) in fluid communication with the EGR system. In some embodiments, the EGR pressure sensor may be in communication with the ECM 106 such that the ECM 106 can change operation of the exhaust gas recirculation system based on the pressure of the exhaust gas. For example, if the ECM 106 determines that the pressure of the exhaust gas must increase, the ECM 106 may cause additional exhaust gas to be directed into the intake system 114.

The IMPT sensor 212 is coupled to the conduit 202 and defines one or more sensor channels extending through a wall of the conduit 202 such that the one or more sensor channels are in fluid communication with the combustible mixture flowing through the conduit 202. The IMPT sensor 212 is configured to measure one or more characteristics of the combustible mixture. For example, the IMPT sensor 212 may be configured to measure the pressure of the combustible mixture as it flows through the conduit 202. The IMPT sensor 212 may also be configured to measure the temperature of the combustible mixture as it flows through the conduit 202. In some embodiments, the IMPT sensor 212 may be in communication with the ECM 106 such that the ECM 106 can change operation of the intake system 114 based on the pressure and/or temperature of the combustible mixture. For example, if the ECM 106 determines that the pressure of the combustible mixture must increase, the ECM 106 may cause additional air to be directed into the combustible mixture. If the ECM 106 determines that the temperature of the combustible mixture must decrease, the ECM 106 may cause the pressure of the air directed into the combustible mixture to decrease.

The mixing unit 122 is shown to include the EGR valve mount 206, the EGR channel 208, and the fuel channel 210. The EGR valve mount 206 includes a valve in communication with the exhaust gas supply (e.g., the exhaust gas conduit, not shown) and with the mixing unit 122. The valve is in communication with the ECM 106 and can open or close at the direction of the ECM 106 to allow more or less exhaust gas into the mixing unit 122. As shown, the EGR valve mount 206 includes multiple EGR channels 208. In various embodiments, the EGR valve mount 206 can include more or fewer (e.g., one) EGR channels 208. Each EGR channel 208 includes an associated EGR valve that can be opened or closed at the direction of the ECM 106.

The fuel channel 210 is coupled to the fuel system 102 via, for example, one or more fuel lines, and provides a pathway through which fuel is directed from the fuel system 102 into the mixing unit 122. The fuel system 102 may include one or more fuel injectors to inject fuel into the one or more fuel lines such that the injected fuel reaches the fuel channel 210 and can be directed into the mixing unit 122. As shown, the fuel channel 210 is positioned upstream of (e.g., positioned closer to the intake than) the EGR channel 208. In some embodiments, the positions of the fuel channel 210 and the EGR channel 208 can be switched (e.g., the EGR channel is positioned upstream of the fuel channel 210).

Figure 3:
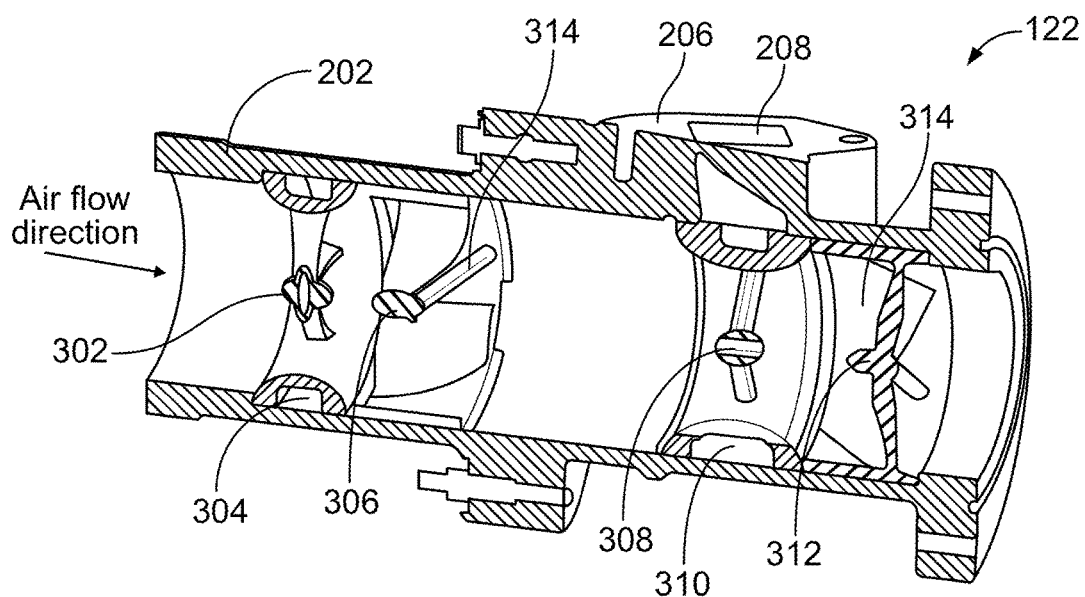
FIG. 3 is an illustration of a cross-section of the mixing unit of the intake system of FIG. 2.

FIG. 3 is an illustration of a cross-section of the mixing unit 122 of the intake system 114 of FIG. 2. The mixing unit 122 is shown to include a fuel doser 302, a fuel pathway 304, and a first mixer 306. The fuel pathway 304 is in fluid communication with the fuel channel 210 and directs fuel to the fuel doser 302. In some embodiments, the fuel pathway 304 extends entirely around an inner diameter of the conduit 202. The fuel pathway 304 may also extend only partially around the inner diameter of the conduit 202. The fuel doser 302 is in fluid communication with the fuel pathway 304 such that the fuel doser 302 is in communication with the fuel from the fuel system 102. The fuel doser 302 can be any type of device or system configured to dispense fuel into the conduit 202 such that the fuel can mix with the air in the conduit 202. In some embodiments, the fuel doser 302 is an atomizer configured to direct fuel into the conduit 202 as a fine spray or mist. The fuel doser 302 may be configured to direct fuel into the conduit 202 in the same direction as the flow of air in the conduit 202 (e.g., in the same direction as the arrow in FIG. 3.). The fuel doser 302 may also be configured to direct fuel into the conduit 202 in a direction perpendicular to the flow of air in the conduit 202 (e.g., directed out of the page in FIG. 3). In some embodiments, the fuel doser 302 may be configured to direct fuel into the conduit 202 in the opposite direction as the flow of air in the conduit 202.

The first mixer 306 is positioned downstream of the fuel doser 302 and is configured to mix the fuel dispensed by the fuel doser 302 with the air flowing through the conduit 202. Accordingly, the first mixer 306 can be any type of device or system that is configured to mix two or more components flowing through a conduit (e.g., the conduit 202). In some embodiments, and as shown in FIG. 3, the first mixer 306 can be a flow disruptor that includes various components (e.g., fins, airfoils, etc.) that are configured to alter the direction of the flow of the two or more components in the conduit 202. As shown, the first mixer 306 includes multiple fins 314 that direct the flow toward the inner wall of the conduit 202 to introduce additional turbulence into the flow to enhance the mixing of the two or more components (e.g., the fuel and air) as the two or more components contact the inner wall of the conduit 202.

The mixing unit 122 is further shown to include an exhaust gas doser 308, an exhaust gas pathway 310, and a second mixer 312. The exhaust gas pathway 310 is in fluid communication with the EGR channel 208 and directs exhaust gas to the exhaust gas doser 308. In some embodiments, the exhaust gas pathway 310 extends entirely around an inner diameter of the conduit 202. The exhaust gas pathway 310 may also extend only partially around the inner diameter of the conduit 202. The exhaust gas doser 308 is in fluid communication with the exhaust gas pathway 310 such that the exhaust gas doser 308 is in communication with the exhaust gas from the exhaust gas recirculation system via the EGR valve 108. The exhaust gas doser 308 can be any type of device or system configured to dispense exhaust gas into the conduit 202 such that the exhaust gas can mix with the air/fuel mixture in the conduit 202. In some embodiments, the exhaust gas doser 308 is an atomizer configured to direct exhaust gas into the conduit 202 as a fine spray or mist. The exhaust gas doser 308 may be configured to direct exhaust gas into the conduit 202 in the same direction as the flow of the air/fuel mixture in the conduit 202 (e.g., in the same direction as the arrow in FIG. 3.). The exhaust gas doser 308 may also be configured to direct exhaust gas into the conduit 202 in a direction perpendicular to the flow of the air/fuel mixture in the conduit 202 (e.g., directed out of the page in FIG. 3). In some embodiments, the exhaust gas doser 308 may be configured to direct exhaust gas into the conduit 202 in the opposite direction as the flow of the air/fuel mixture in the conduit 202.

The second mixer 312 is positioned downstream of the exhaust gas doser 308 and is configured to mix the exhaust gas dispensed by the exhaust gas doser 308 with the air/fuel mixture flowing through the conduit 202. Accordingly, the second mixer 312 can be any type of device or system that is configured to mix two or more components flowing through a conduit (e.g., the conduit 202). In some embodiments, and as shown in FIG. 3, the second mixer 312 can be a flow disruptor that includes various components (e.g., fins, airfoils, etc.) that are configured to alter the direction of the flow of the two or more components in the conduit 202. As shown, the second mixer 312 includes multiple fins 316 that direct the flow toward the inner wall of the conduit 202 to introduce additional turbulence into the flow to enhance the mixing of the two or more components (e.g., the fuel, air, and exhaust gas) as the two or more components contact the inner wall of the conduit 202.

As shown in FIG. 3, the fuel doser 302 and the first mixer 306 are positioned upstream of the exhaust gas doser 308 and the second mixer 312. In some embodiments, the positions of the fuel doser 302 and the first mixer 306, and the exhaust gas doser 308 and the second mixer 312 are switched such that the exhaust gas is dispensed upstream of the fuel. Furthermore, and in additional embodiments, more than two dosers can be used. For example, two or more dosers/mixers can be positioned within the conduit 202 to dispense fuel into the conduit 202, and two or more dosers/mixers can be positioned within the conduit 202 to dispense exhaust gas into the conduit 202. In such embodiments, the positions of the dosers/mixers may vary. For example, all of the fuel dosers/mixers can be positioned upstream of all of the exhaust gas dosers/mixers. In some arrangements, all of the fuel dosers/mixers can be positioned downstream of all of the exhaust gas dosers/mixers. In some instances, the fuel dosers/mixers alternate with the exhaust gas dosers/mixers.

Figure 4:
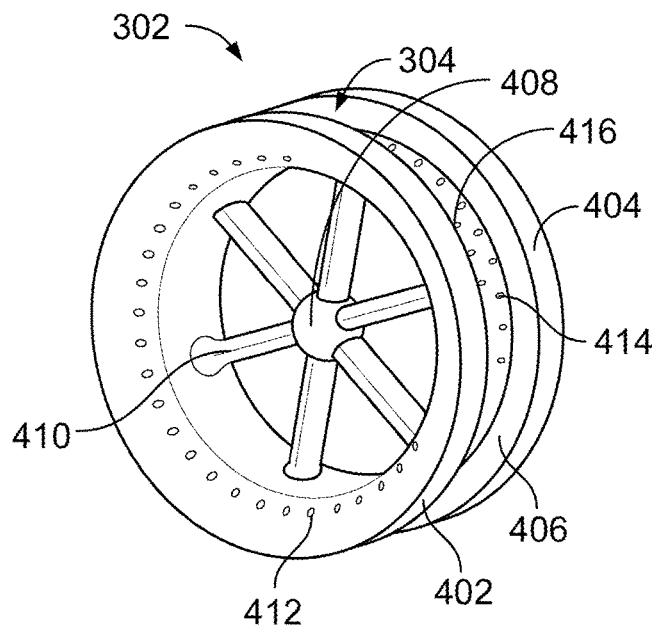
FIGS. 4-6 are illustrations of various views of an example fuel doser for use in the mixing unit of FIG. 3.
Figure 5:
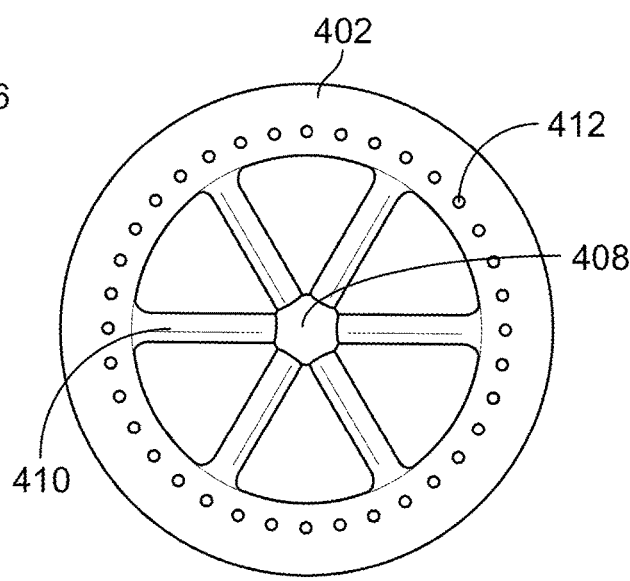
Figure 6:
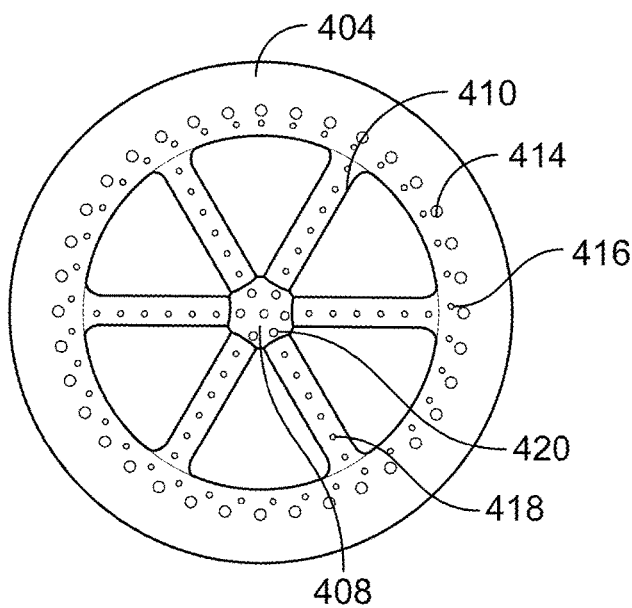

FIGS. 4-6 are illustrations of various views of an example fuel doser 302 (a first doser) for use with the mixing unit 122 of FIG. 3. The fuel doser 302 is shown to include an upstream portion 402 and a downstream portion 404. The upstream portion 402 is positioned further upstream in the conduit 202 than the downstream portion 404. For example, the upstream portion 402 is positioned closer to the intake throttle 120 than the downstream portion 404. The upstream portion 402 and the downstream portion 404 define a recessed portion 406 positioned in between the upstream portion and the downstream portion. The upstream portion 402, the downstream portion 404, the recessed portion 406, and the conduit 202 define the fuel pathway 304. As shown, the fuel doser 302 comprises a substantially circular cross-sectional shape such that the cross-sectional shape of the fuel doser 302 substantially matches the cross-sectional shape of the conduit 202. In some embodiments, the fuel doser 302 comprises a different cross-sectional shape (e.g., oval, rectangular, etc.) to match the cross-sectional shape of the conduit 202.

The fuel doser 302 further includes a plurality of spokes 410 extending from an inner surface of the fuel doser 302 toward a central hub 408. While six spokes 410 are shown, one of skill in the art would understand that more or fewer spokes could be used to couple the central hub with the inner surface of the fuel doser 302. Furthermore, in some embodiments the spokes 410 are spaced substantially equidistantly from each other around the central hub 408. In the example embodiment shown, the spokes 410 are each spaced sixty degrees from each other. The spokes 410 may also be spaced around the central hub 408 in a manner in which the spokes 410 are not spaced substantially equidistantly from each other.

The upstream portion 402 defines a plurality of openings 412 that extend entirely through a wall of the upstream portion 402. The plurality of openings 412 are in fluid communication with the fuel pathway 304 such that fuel is dispensed into the conduit 202 in the upstream direction via the plurality of openings 412. As shown, the upstream portion 402 defines thirty-six openings 412, however one of skill in the art would understand that more or fewer openings 412 could be used. In some embodiments, the thirty-six openings 412 are spaced substantially equidistantly apart around the upstream portion 402. The openings 412 may also be positioned such that the openings 412 are not spaced substantially equidistantly around the upstream portion 402.

The downstream portion 404 defines a plurality of openings 414 and a plurality of openings 416 (referred to herein as "openings 414 and 416"), each of which extend entirely through a wall of the downstream portion 404. The openings 414 and 416 are in fluid communication with the fuel pathway 304 such that fuel is dispensed into the conduit 202 in the downstream direction via the openings 414 and 416. As shown, the downstream portion 404 defines thirty-six openings 414 and thirty-six openings 416, however one of skill in the art would understand that more or fewer openings 414 and 416 could be used. In some embodiments, the openings 414 and 416 are spaced substantially equidistantly apart around the downstream portion 404. The openings 414 and 416 may also be positioned such that the openings 414 and 416 are not spaced substantially equidistantly around the downstream portion 404.

In some embodiments, each of the spokes 410 defines an internal channel (not shown) in fluid communication with the fuel pathway 304 such that the internal channel directs fuel from the internal channel to the central hub 408. Each of the spokes 410 further defines a plurality of openings 418 positioned on a downstream side of the spokes 410 and extending entirely through a respective wall of each of the spokes 410. Each opening 418 is in fluid communication with the internal channel and can direct fuel into the conduit 202 in the downstream direction. As shown, each of the spokes 410 defines six openings 418, however in various embodiments more or fewer openings 418 can be used. The central hub 408 defines a hollow, internal portion in fluid communication with the internal channels from each of the spokes 410. The central hub 408 further defines apertures 420 extending entirely through a wall of the central hub such that each of the apertures 420 is in fluid communication with the internal portion and can direct fuel into the conduit 202 in the downstream direction.

In operation, fuel is delivered to the fuel pathway 304 via the fuel channel 210. The fuel flows around the fuel pathway 304 and through the various openings and channels defined by the fuel doser 302 as described such that the fuel is delivered to the conduit 202 to be mixed with the air flowing through the conduit 202.

Figure 7:
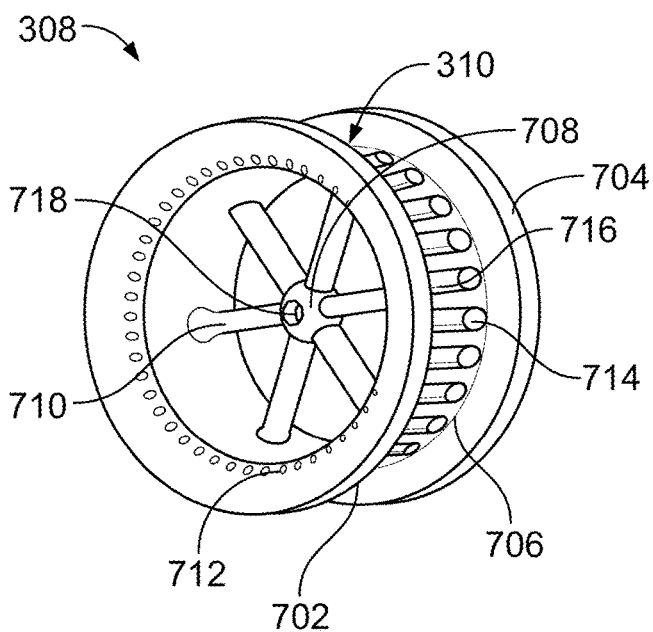
FIGS. 7-9 are illustrations of various views of an example exhaust gas doser for use with the mixing unit of FIG. 3.
Figure 8:
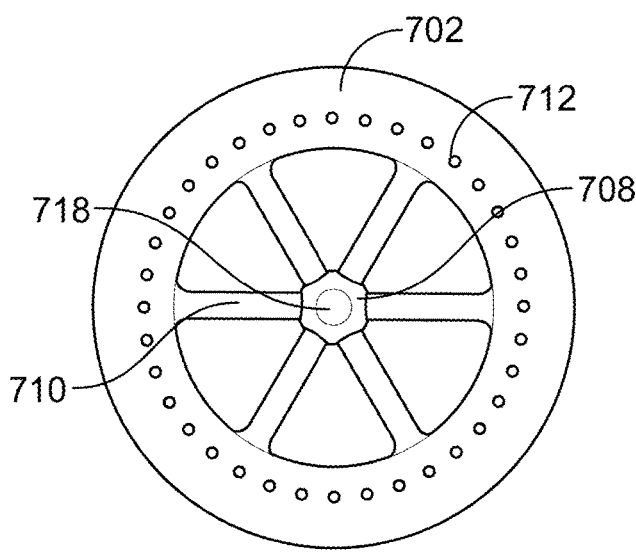
Figure 9:
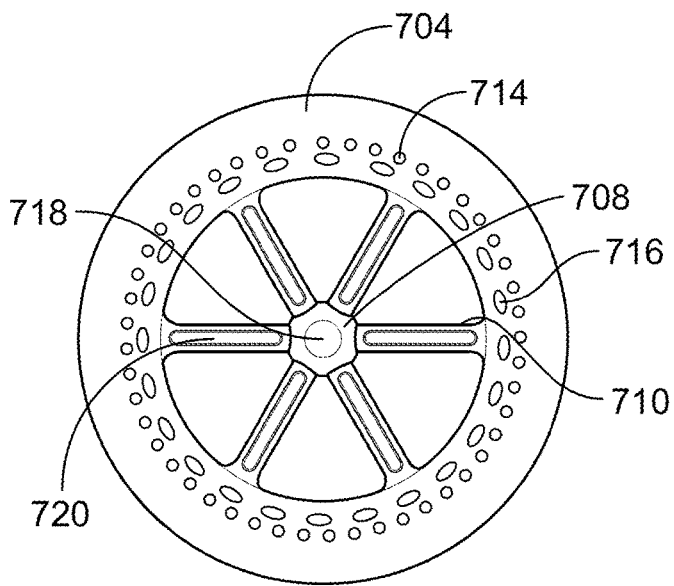

FIGS. 7-9 are illustrations of various views of an example exhaust gas doser 308 (a second doser) for use with the mixing unit 122 of FIG. 3. The exhaust gas doser 308 is shown to include an upstream portion 702 and a downstream portion 704. The upstream portion 702 is positioned further upstream in the conduit 202 than the downstream portion 704. For example, the upstream portion 702 is positioned closer to the intake throttle 120 than the downstream portion 704. The upstream portion 702 and the downstream portion 704 define a recessed portion 706 positioned in between the upstream portion and the downstream portion. The upstream portion 702, the downstream portion 704, the recessed portion 706, and the conduit 202 define the exhaust gas pathway 310. As shown, the exhaust gas doser 308 comprises a substantially circular cross-sectional shape such that the cross-sectional shape of the exhaust gas doser 308 substantially matches the cross-sectional shape of the conduit 202. In some embodiments, the exhaust gas doser 308 comprises a different cross-sectional shape (e.g., oval, rectangular, etc.) to match the cross-sectional shape of the conduit 202.

The exhaust gas doser 308 further includes a plurality of spokes 710 extending from an inner surface of the exhaust gas doser 308 toward a central hub 708. While six spokes 710 are shown, one of skill in the art would understand that more or fewer spokes could be used to couple the central hub with the inner surface of the exhaust gas doser 308. Furthermore, in some embodiments the spokes 710 are spaced substantially equidistantly from each other around the central hub 708. In the example embodiment shown, the spokes 710 are each spaced sixty degrees from each other. The spokes 710 may also be spaced around the central hub 708 in a manner in which the spokes 710 are not spaced substantially equidistantly from each other.

The upstream portion 702 defines a plurality of openings 712 that extend entirely through a wall of the upstream portion 702. The plurality of openings 712 are in fluid communication with the exhaust gas pathway 310 such that exhaust gas is dispensed into the conduit 202 in the upstream direction via the plurality of openings 712. As shown, the upstream portion 702 defines forty-eight openings 712, however one of skill in the art would understand that more or fewer openings 712 could be used. In some embodiments, the forty-eight openings 712 are spaced substantially equidistantly apart around the upstream portion 702. The openings 712 may also be positioned such that the openings 712 are not spaced substantially equidistantly around the upstream portion 702.

The downstream portion 704 defines a plurality of openings 714 and a plurality of openings 716 (referred to herein as "openings 414 and 416"), each of which extend entirely through a wall of the downstream portion 704. The openings 714 and 716 are in fluid communication with the exhaust gas pathway 310 such that fuel is dispensed into the conduit 202 in the downstream direction via the openings 714 and 716. As shown, the downstream portion 704 defines forty-eight openings 714 and twenty-four openings 716, however one of skill in the art would understand that more or fewer openings 714 and 716 could be used. In some embodiments, the openings 714 and 716 are spaced substantially equidistantly apart around the downstream portion 704. The openings 714 and 716 may also be positioned such that the openings 714 and 716 are not spaced substantially equidistantly around the downstream portion 704.

In some embodiments, each of the spokes 710 defines an internal channel 720 in fluid communication with the exhaust gas pathway 310 such that the internal channel directs exhaust gas from the internal channel to the central hub 708. The internal channel 720 also extends entirely through the spoke 710 such that the internal channel 720 is also in fluid communication with the conduit 202 and directs exhaust gas to the conduit 202 in the downstream direction. The central hub 708 defines a hollow, portion that extends entirely through the central hub 708 in both the upstream and downstream directions, and is in fluid communication with the conduit 202 such that exhaust gas that reaches the central hub 708 from the internal channel 720 is directed into the conduit 202 in either the upstream or downstream directions.

In operation, exhaust gas is delivered to the exhaust gas pathway 310 via the EGR channel 208. The exhaust gas flows around the exhaust gas pathway 310 and through the various openings and channels defined by the exhaust gas doser 308 as described such that the exhaust gas is delivered to the conduit 202 to be mixed with the air/fuel mixture flowing through the conduit 202.

Figure 10:
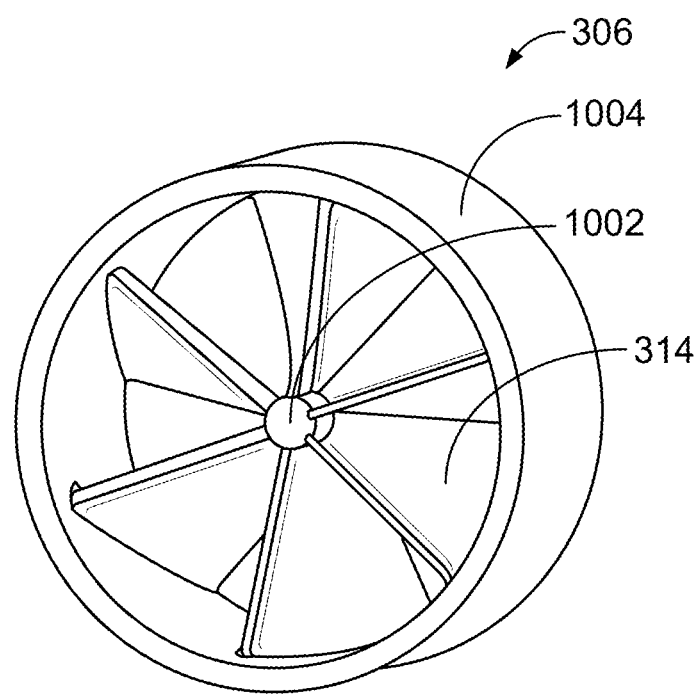
FIG. 10 is an illustration of a perspective view of an example first mixer for use with the mixing unit of FIG. 3.

FIG. 10 is an illustration of a perspective view of the first mixer 306 of the mixing unit 122 of FIG. 3. While only the first mixer 306 is shown, the second mixer 312 is substantially similar in structure and function to the first mixer 306. Accordingly, the description of the first mixer 306 also applies to the second mixer 312. The first mixer 306 is shown to include an outer portion 1004 and a central hub 1002. The outer portion 1004 comprises a substantially circular cross-sectional shape that is configured to fit within the conduit 202. The first mixer 306 further comprises a plurality of fins 314 coupled to and extending between the outer portion 1004 and the central hub 1002. As shown, first mixer 306 includes six fins 314 arranged around the central hub 1002. In various embodiments, the first mixer 306 can include more or fewer fins 314 arranged around the central hub 1002. The fins 314 are shown as being arranged substantially equidistantly from each other. For example, the six fins 314 are arranged such that the angle between each adjacent fins 314 is approximately sixty degrees. In some embodiments, the fins 314 are arranged such that the distance between each fin 314 is not substantially the same.

In operation, the first mixer 306 is positioned downstream of the fuel doser 302. The fins 314 of the first mixer 306 are configured to contact the air/fuel mixture as the air/fuel mixture flows through the conduit 202 and alter the flow direction of the air/fuel mixture to facilitate substantially homogeneous mixing of the air/fuel mixture. Similarly, the second mixer 312 is positioned downstream of the exhaust gas doser 308 and is configured to alter the flow direction of the air/fuel/exhaust gas mixture (e.g., the combustible mixture) to facilitate substantially homogeneous mixing of the combustible mixture.

Implementations described herein have been shown to have a number of beneficial effects. For instance, positioning the mixing unit 122 near the intake connection 110 allows the combustible mixture to become a substantially homogeneous mixture as it moves from the mixing unit 122 and through the conduit 202. Furthermore, the combustible mixture delivered to the one or more combustion cylinders has a maximum variation in lambda of 0.969-1.012, where lambda is defined as the ratio of the air/fuel ratio in a cylinder to the stoichiometric air/fuel ratio. Additionally, when the natural gas engine 100 is running at normal or high load conditions (e.g., the engine torque is greater than 800 lb-ft), the EGR variation (e.g., the difference between the highest EGR flowrate and the lowest EGR flowrate) is within two percent.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. An intake system for an engine, comprising:
a conduit configured to direct a combustible mixture to a cylinder head;
a mixing unit coupled to the conduit, the mixing unit comprising:
a fuel doser configured to dispense fuel into the conduit;
a first mixer positioned downstream of the fuel doser, the first mixer configured to mix air and the fuel;
an exhaust gas doser configured to dispense exhaust gas into the conduit;
a second mixer positioned downstream of the exhaust gas doser, the second mixer configured to mix the exhaust gas with the air and the fuel to make the combustible mixture; and
an air intake throttle configured to direct the air into the mixing unit.

2. The intake system of claim 1, further comprising:
a fuel pathway in fluid communication with the fuel doser, the fuel pathway configured to direct the fuel from a fuel system to the fuel doser; and
an exhaust gas pathway in fluid communication with the exhaust gas doser, the exhaust gas pathway configured to direct the exhaust gas from an exhaust gas recirculation system to the exhaust gas doser.

3. The intake system of claim 1, wherein the fuel doser comprises a first atomizer configured to dispense the fuel into the conduit, and wherein the exhaust gas doser comprises a second atomizer configured to dispense the exhaust gas into the conduit.

4. The intake system of claim 1 wherein the fuel doser is positioned upstream of the exhaust gas doser.

5. The intake system of claim 1 wherein the fuel doser is positioned downstream of the exhaust gas doser.

6. The intake system of claim 1 wherein the fuel comprises natural gas.

7. A mixing unit positioned within an intake system of an engine system, the mixing unit in fluid communication with a fuel system of the engine system and an exhaust gas recirculation system of the engine system, the mixing unit comprising:
a conduit;
a fuel doser positioned within the conduit, the fuel doser comprising:
a first upstream portion;
a first downstream portion; and
a first recessed portion positioned between the first upstream portion, the first downstream portion, and the conduit, the first recessed portion configured to receive fuel from the fuel system and direct the fuel into the conduit to mix the fuel with air flowing through the conduit; and
an exhaust gas doser positioned within the conduit and downstream of the fuel doser, the exhaust gas doser comprising:
a second upstream portion;
a second downstream portion; and
a second recessed portion positioned between the second upstream portion, the second downstream portion, and the conduit, the second recessed portion configured to receive exhaust gas from the exhaust gas recirculation system and direct the exhaust gas into the conduit to mix the exhaust gas with the fuel and the air flowing through the conduit.

8. The mixing unit of claim 7, wherein the fuel doser further comprises:
a first plurality of openings defined by the first upstream portion and extending entirely through the first upstream portion such that the first recessed portion is in fluid communication with an upstream portion of the conduit; and
a second plurality of openings defined by the first downstream portion and extending entirely through the first downstream portion such that the first recessed portion is in fluid communication with a downstream portion of the conduit.

9. The mixing unit of claim 8, wherein the fuel doser further comprises:
a central hub; and
a plurality of spokes coupled with and extending between an inner surface of the fuel doser and the central hub.

10. The mixing unit of claim 9, wherein the fuel doser defines a plurality of internal channels defined by the plurality of spokes, each of the plurality of internal channels associated with a corresponding one of the plurality of spokes, the plurality of internal channels in fluid communication with the first recessed portion.

11. The mixing unit of claim 10, wherein each of the plurality of spokes defines a third plurality of openings extending entirely through each of the plurality of spokes in a downstream direction such that each of the plurality of internal channels is in fluid communication with each of the third plurality of openings.

12. The mixing unit of claim 10 wherein the central hub defines a hollow portion in fluid communication with the plurality of internal channels and defines a plurality of apertures extending entirely through the central hub in a downstream direction such that the hollow portion is in fluid communication with the conduit.

13. The mixing unit of claim 7 further comprising a first mixer positioned downstream of the fuel doser, the first mixer comprising:
an outer portion;
a central hub; and
a plurality of fins coupled to and extending between the outer portion and the central hub of the first mixer, the plurality of fins configured to alter a flow direction of the fuel and the air flowing through the conduit to cause the fuel and the air to mix.

14. An engine system, comprising:
an intake system positioned between an air source and a cylinder head, the intake system comprising:
a conduit configured to direct a combustible mixture to the cylinder head;
a mixing unit coupled to the conduit, the mixing unit comprising:
a fuel doser configured to dispense a first material into the conduit;
an exhaust gas doser configured to dispense a second material into the conduit;
a first mixer positioned between the fuel doser and the exhaust gas doser;
a second mixer positioned downstream of the fuel doser and the exhaust gas doser, the second mixer comprising a second outer portion and a second central hub; and
an air intake throttle in communication with the air source, the air intake throttle configured to direct the air into the mixing unit.

15. The engine system of claim 14, further comprising:
a first pathway in fluid communication with the fuel doser, the first pathway configured to direct the first material to the fuel doser; and
a second pathway in fluid communication with the exhaust gas doser, the second pathway configured to direct the second material to the exhaust gas doser.

16. The engine system of claim 15, wherein the fuel doser comprises a first atomizer configured to dispense the first material into the conduit, and wherein the exhaust gas doser comprises a second atomizer configured to dispense the second material into the conduit.

17. The engine system of claim 14, wherein the first mixer further comprises a first outer portion and a first central hub.

18. The engine system of claim 17, wherein the first mixer further comprises a first plurality of fins coupled to and extending between the first outer portion and the first central hub.

19. The engine system of claim 18, wherein the second mixer further comprises a second plurality of fins coupled to and extending between the second outer portion and the second central hub.

20. The engine system of claim 18, wherein the first plurality of fins is configured to alter a flow direction of air flowing through the conduit and a flow direction of the first material or the second material to cause the air and the first material or the second material to mix.

21. The engine system of claim 19, wherein the second plurality of fins is configured to alter a flow direction of the second material, the first material, and the air flowing through the conduit to cause the second material, the first material, and the air to mix to make a combustible material.

22. The engine system of claim 14 wherein the fuel doser is positioned upstream of the exhaust gas doser.

23. The engine system of claim 22, wherein the first material is a fuel and the second material is exhaust gas.

24. The engine system of claim 22, wherein the first material is exhaust gas and the second material is a fuel.

25. The engine system of claim 24, wherein the fuel is natural gas.

* * * * *